(12) United States Patent
Murynets

(10) Patent No.: US 10,341,375 B2
(45) Date of Patent: Jul. 2, 2019

(54) RESOLVING CUSTOMER COMMUNICATION SECURITY VULNERABILITIES

(71) Applicant: AT&T INTELLECTUAL PROPERTY I, L.P., Atlanta, GA (US)

(72) Inventor: Ilona Murynets, Rutherford, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 303 days.

(21) Appl. No.: 14/562,137

(22) Filed: Dec. 5, 2014

(65) Prior Publication Data

US 2016/0164903 A1    Jun. 9, 2016

(51) Int. Cl.
| | | |
|---|---|---|
| *H04L 29/06* | (2006.01) | |
| *G06F 11/36* | (2006.01) | |
| *G06F 11/30* | (2006.01) | |
| *G06F 11/34* | (2006.01) | |
| *G06F 21/56* | (2013.01) | |
| *H04L 12/26* | (2006.01) | |
| *H04L 12/24* | (2006.01) | |

(52) U.S. Cl.
CPC ...... *H04L 63/1433* (2013.01); *G06F 11/3006* (2013.01); *G06F 11/3476* (2013.01); *G06F 11/3612* (2013.01); *G06F 21/56* (2013.01); *G06F 2201/86* (2013.01); *G06F 2201/88* (2013.01); *H04L 41/5009* (2013.01); *H04L 41/5035* (2013.01); *H04L 43/0811* (2013.01); *H04L 43/0823* (2013.01)

(58) Field of Classification Search
CPC ............. G06F 11/3006; G06F 11/3476; G06F 11/3612; G06F 21/56; G06F 2201/86; G06F 2201/88; H04L 41/5009; H04L 41/5035; H04L 43/0811; H04L 43/0823
See application file for complete search history.

(56) References Cited

U.S. PATENT DOCUMENTS

| | | | |
|---|---|---|---|
| 6,147,975 A * | 11/2000 | Bowman-Amuah | ... H04L 41/06 370/232 |
| 8,201,257 B1 * | 6/2012 | Andres | ................. G06F 21/568 726/23 |
| 8,510,826 B1 | 8/2013 | Reams, III et al. | |
| 8,650,637 B2 | 2/2014 | Beresnevichiene et al. | |
| 2004/0267929 A1 | 12/2004 | Xie | |
| 2005/0038827 A1 * | 2/2005 | Hooks | ................. G06F 11/0748 |

(Continued)

OTHER PUBLICATIONS

U.S. Appl. No. 14/337,808 to Ilona Murynets et al., filed Jul. 22, 2014.

(Continued)

*Primary Examiner* — Carl G Colin
*Assistant Examiner* — Gary E Lavelle
(74) *Attorney, Agent, or Firm* — Greenblum & Bernstein, P.L.C.

(57) ABSTRACT

Customer communication security vulnerabilities are resolved. A usage history is obtained for a user device including communications involving the user device. Pattern recognition is applied to the usage history. The user device is assigned with a risk classification from a predetermined set of possible risk classifications, based on the pattern recognition. A vulnerability on the user device is remedied when the risk classification exceeds a predetermined threshold.

20 Claims, 9 Drawing Sheets

(56) References Cited

U.S. PATENT DOCUMENTS

| | | | |
|---|---|---|---|
| 2005/0183143 A1* | 8/2005 | Anderholm | G06F 11/32 726/22 |
| 2007/0100653 A1* | 5/2007 | Ramer | G06F 17/30749 705/1.1 |
| 2009/0113246 A1* | 4/2009 | Sabato | G06F 11/0769 714/37 |
| 2010/0088410 A1* | 4/2010 | Ridley | H04L 41/0896 709/224 |
| 2010/0306847 A1 | 12/2010 | Lambert et al. | |
| 2012/0017281 A1 | 1/2012 | Banerjee et al. | |
| 2012/0144492 A1* | 6/2012 | Griffin | G06F 21/56 726/25 |
| 2013/0086636 A1* | 4/2013 | Golovanov | G06F 21/56 726/3 |
| 2013/0205397 A1 | 8/2013 | De Barros et al. | |
| 2014/0143863 A1 | 5/2014 | Deb et al. | |
| 2014/0149411 A1* | 5/2014 | Anand | G06F 17/30654 707/737 |
| 2014/0173738 A1 | 6/2014 | Condry et al. | |
| 2014/0189861 A1 | 7/2014 | Gupta et al. | |
| 2014/0201836 A1 | 7/2014 | Amsler | |
| 2014/0215629 A1 | 7/2014 | Raz et al. | |
| 2015/0096024 A1* | 4/2015 | Haq | H04L 63/145 726/23 |
| 2015/0215325 A1* | 7/2015 | Ogawa | G06F 17/30091 726/23 |

OTHER PUBLICATIONS

Canali et al., "The Role of Web Hosting Providers in Detecting Compromised Vehicles", Proceedings of the 22nd International Conference on World Wide Web. International World Wide Web Conferences Steering Committee (IW3C2), May 13-17, 2013, pp. 177-187.

* cited by examiner

Computer**

User(s)
710

Analytics/Label/
Remediation System
740

Big Data
(Customer Traffic)
Database 765

S701

S705
S706
S707
S708
S709

RESOLVING CUSTOMER COMMUNICATION SECURITY VULNERABILITIES

BACKGROUND

1. Field of the Disclosure

The present disclosure relates to the field of communications security. More particularly, the present disclosure relates to both regressively diagnosing and proactively addressing communications security concerns based on user usage histories.

2. Background Information

Communications devices are increasingly mobile. Additionally, devices are increasing being given more and more functionality such as internet access over data networks. With the increased internet access, users are increasingly running into trouble with popups, viruses and other results of security vulnerabilities. In some instances, even data overages can be blamed on security vulnerabilities.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
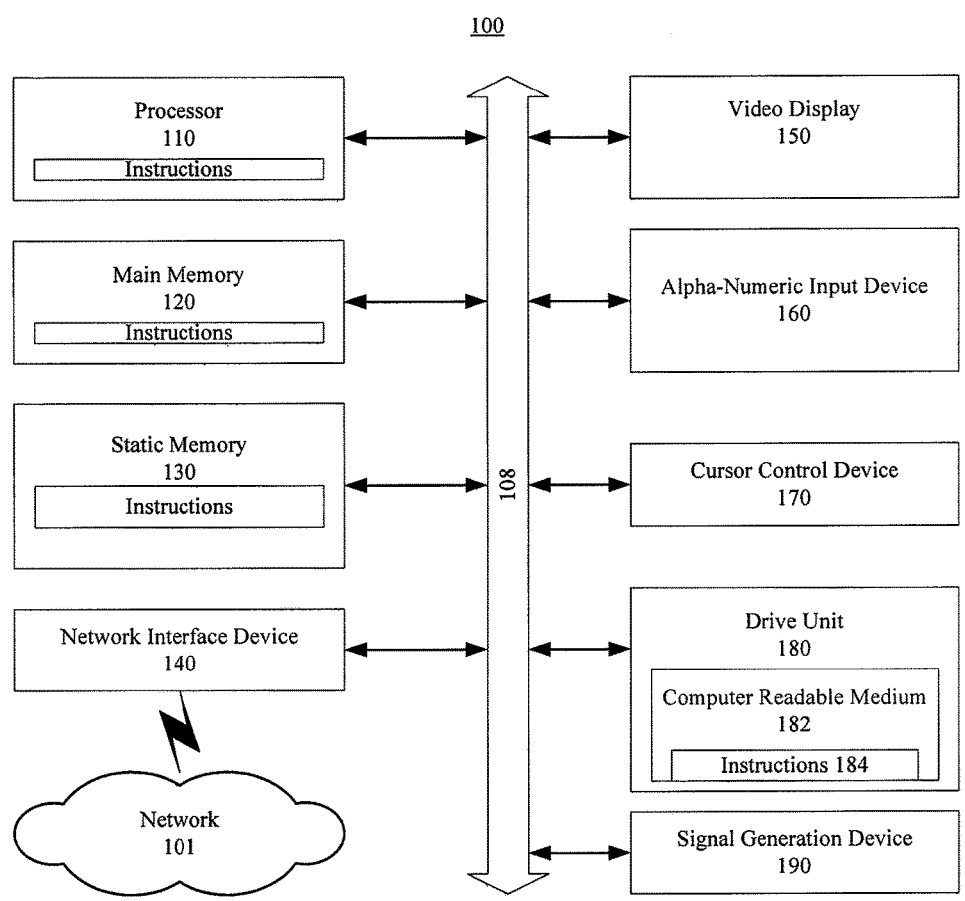
FIG. 1 shows an exemplary general computer system that includes a set of instructions for resolving customer communication security vulnerabilities.

FIG. 1 is an illustrative embodiment of a general computer system, on which a method of resolving customer communication security vulnerabilities can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a communications device, a control system, a web appliance, a network router, switch or bridge, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

As described herein, an entity such as a communications service provider can resolve security vulnerabilities both reactively and proactively. A communications service provider may today have unique access to user data for user communications that cross a network provided by or managed by the communications service provider. However, a communications service provider may also provide access to such user data to a third party, such as a government or security firm in order to help resolve security vulnerabilities.

The amount of data that can be used in a security analysis is enormous, and properly termed herein "Big Data". For example, a communications service provider may store data for user communications such as upload and download volumes, times, destination addresses, logged-in users, and so on. Additionally, an individual application installed on a device may also transmit data to a system coordinated by the application provider. An operating system provider may transmit data to a system coordinated by the operating system provider. Local access nodes such as public WiFi providers may also forward data to a coordinated system. In any of these instances, the data may be upload, download, time, address, logged-in user, and other forms of metadata descriptive of a communication.

The data may be representative of a website visit, such as when a user of a smart phone uses the smart phone to visit a website. The communications service provider that provides network access for the smart phone may record the metadata for the visit and all internet use, such as the data described above. For lengthy visits to a website, the communications service provider may record a set amount of time visiting a website as a visit, such as 5 minutes. In this way, a user using a smart phone to visit a single website for 30 minutes may be recorded as visiting the website six times for the purposes of the present disclosure.

Additionally, the information stored and used by a communications service provider can vary. For example, more detailed data may be stored and only selectively used, such as to show a time sequence of domain visits. In this case it can be possible to see, for example, which webpages are redirecting to another, "risky", webpage. The default data used for reviews may be only base flow aggregates such as showing upload and download volumes for, e.g., 5 minute time periods, so as to review aggregated data for customer uses until an anomaly is detected from the aggregated data. When an anomaly is detected, the more detailed information from a period can be obtained and reviewed to identify the likely source or cause of the anomaly.

A theme that runs through this disclosure is that the data descriptive of communications, i.e., the metadata maintained by communications service providers, application and operating system providers, network access providers and so on, can be used to diagnose security vulnerabilities. Customers who use user devices may be engaging in unsafe behavior by visiting certain websites, clicking on certain links, and so on. Use of comprehensive data of use of user devices and even just applications on user device provides an ability to resolve customer communication security vulnerabilities both reactively and proactively.

Figure 2:
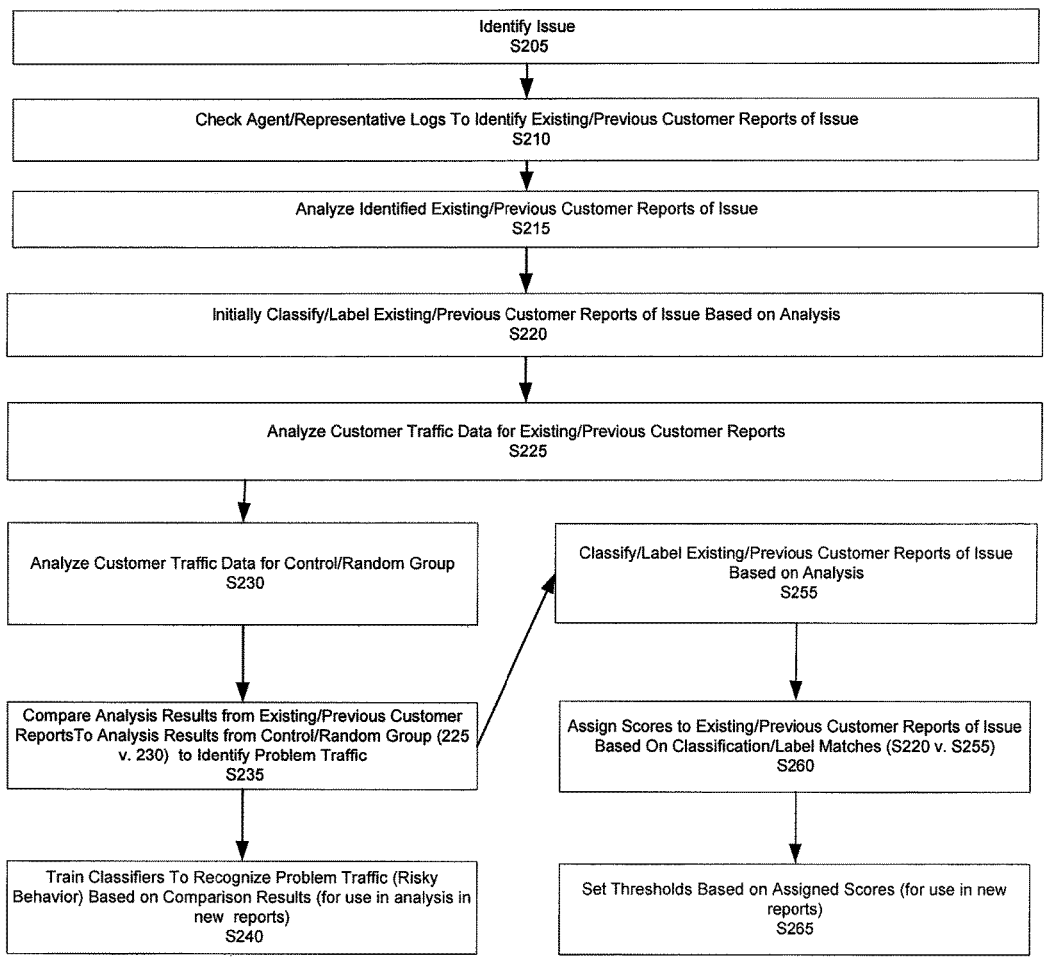
FIG. 2 shows an exemplary process for resolving customer communication security vulnerabilities, according to an aspect of the present disclosure.

FIG. 2 shows an exemplary process for resolving customer communication security vulnerabilities, according to an aspect of the present disclosure. In FIG. 2, an issue is identified at S205. The issue may be identified based on a review of customer accounts, based on receipt of a customer complaint or question, or based on any other reason. The issues in questions are issues that reflect or are likely to reflect security vulnerabilities.

For an entity that provides customer care agents, either human or automated such as interactive voice response (IVR) systems, agent logs of existing complaints and inquiries can be searched at S210 to see if there are any existing reports made to agents for the issue or a closely related issue. This check can be automated, such as by doing a comparative keyword search for mention of a noted website address, or a certain type of problem. As is known, issues may arise with some types of devices but not others, some types of operating systems but not others, and some types of activity but not others. Therefore, keyword combinations may be utilized to narrow down and identify existing reports most likely to relate to the issue identified at S205.

At S215, the existing/previous customer reports of the issue are analyzed. The analysis may be to ensure the reports actually relate to the issue identified at S205. The analysis at S215 may identify details in the reports that are more descriptive of the issue than the original identification of the issue at S205. The analysis at S215 may include isolating details of the reports to a specific problem from pre-set categories such as "popups", "virus", "freeze"/"frozen", "won't turn off" etc. The analysis at S215 may also include isolating particular communications destinations such as particular websites that the reporting customers think may be the source of the reported problem.

At S220, the existing/previous customer reports are classified and labeled. The classifications may be preset classifications of how serious the customer reports are, the types of problems reported in the customer reports, and/or how likely the customer reports are to relate to the issue identified at S205. Similarly, the labels may be from a predetermined set of labels. Both the classification and the labeling of each report at S220 are based on the analysis at S215, which in turn is based on the actual content of the customer reports.

At S225, customer traffic data for the reporting customers who reported the existing/previous customer reports is analyzed. The analysis at S225 may include many different aspects, so a variety of these aspects are described here. It should be noted that a communication service provider may have the communication metadata that includes starting times, ending times, duration time, uplink and downlink data rates and volumes, and source and destination addresses. A destination may be identified by identifiers including:
   phone number
   website address
   internet protocol (IP) address
   local area network or VPN identifier that masks a specific fixed internet protocol (IP) address
Additionally, a source may be a customer of the communications service provider, and may be identified by identifiers including:
   device identifier
   telephone number or other communications address
   customer name or account number Thus, when an account has multiple devices and users, communications may still be identified by device or user. Additionally, though not particularly required for the present disclosure, a communications service provider may also possess and store large amounts of geolocation data, such as check-in locations and times from WiFi systems connected to a network, GPS data for GPS-enabled cell phones, or tower data from tower signals used to synchronize communications for mobile devices. This data may be useful in identifying, for example, risky public WiFi systems that do not provide secure communications.

Information that can be used by a communications service provider may also include whitelists and blacklists of destination sites, particularly including the most popular websites. In this way, popular websites that have been thoroughly verified as "safe" may be placed on a whitelist and excluded from consideration in the analysis at S225. Similarly, websites may be set in several categories, such as known-safe, known-unsafe, and unknown/new. In this way, a communications service provider that is performing an analysis at S225 may be able to identify potentially risky destination websites for follow-up such as a visit by a security expert or analysis by a security program that analyzes and rates websites for riskiness in different areas. Website risks may be rated in areas such as viruses, popups, cookies, and so on. In this way, an unknown/new website may be given a new status on a list, such as known-safe or known-unsafe.

The analysis at S225 may include analyzing website traffic for multiple users. The analysis may be limited to a specific period, such as last two weeks, last one week, or last three days. Results may also be averaged, such as by averaging website visit time for different visitors to a particular website. In this way a unknown/new website can be checked when it is visited by multiple users being analyzed to see how long the average user visited the unknown/new website. An individual user's traffic history can also be averaged, such as average time per visit to any destination, average time per visit to particular types of destinations, or average time per visit to particular destinations.

At S230, customer traffic data for a control group/random group is analyzed. The analysis of the control group/random group at S230 should be consistent with the analysis of the reporting group at S225, to ensure comparability.

At S235, the analysis results of the two groups are compared, to identify problem traffic. Problem traffic may be identified from websites that are visited more by users in the reporting group than then control group, or other kinds of differences identifiable from the comparison. Differences may include visit times, visit amounts, visit durations, upload and/or download volumes associated with particular websites, and so on. In this way, likely sources of problems may be identified, such as a reporting group downloading volumes of data from a website that is either less visited by the control group, or that is not correlated with download amounts by the control group.

At S240, classifiers can be trained to recognize problem traffic which reflects risky behavior. The classifiers can be trained to recognize the characteristics that are different between the reporting group and the control group, such as particular destination addresses or particular conduct (i.e., uploading or downloading) on particular destination addresses. These classifiers can be used later for new reports of new issues. The classifiers can be small sets of software instructions including the characteristics and how they are recognized/identified.

At S255, the existing/previous customer reports of the issue are classified and labeled again, now based on the analysis at S230. The classifications labels can be correlated with the findings of riskiness, and may even include classifications and labels indicating that an existing/previous customer's traffic was not found to be particular risky. The classifications and labels can indicate both the level of riskiness as well as any identified cause or type of cause of the riskiness. For example, a classification and label may identify that a user's behavior including visiting risky websites, or downloading risky material from a well-known website.

At S260, scores are assigned to the existing/previous customer reports based on the classification/label matches between classifications/labels assigned at S220 before analysis versus S255 after analysis. A score may reflect that a user has repeatedly visited one or more risky websites, or otherwise engaged in risky behavior. As an example, a website may be given a coefficient C, and the number of times a user has visited the website in an analyzed period may be multiplied by the coefficient C, to give a total score just for that website. The same calculation may be made for each risky website visited by the user during the analyzed period, and the total of the calculations can be added in order to determine the total score assigned at S260. The score may also reflect another coefficient to multiply or predetermined number to add for particularly risky behavior, such as downloading or uploading at known risky websites. In this way, the score may reflect both the riskiness of different websites, the number of times a user visits such websites, and whether the user downloads or uploads data from/to the websites.

At S265, thresholds can be set based on the assigned scores. The thresholds can be used in evaluating new reports, and reflect analysis of multiple previous reports of the issue as analyzed initially at S215 and based on customer traffic at S230. In this way, when a customer's traffic is analyzed later for the same issue, the score(s) assigned based on the analysis can be compared to one or more predetermined thresholds in order to determine whether the new customer report is based on comparatively risky behavior.

Figure 3:
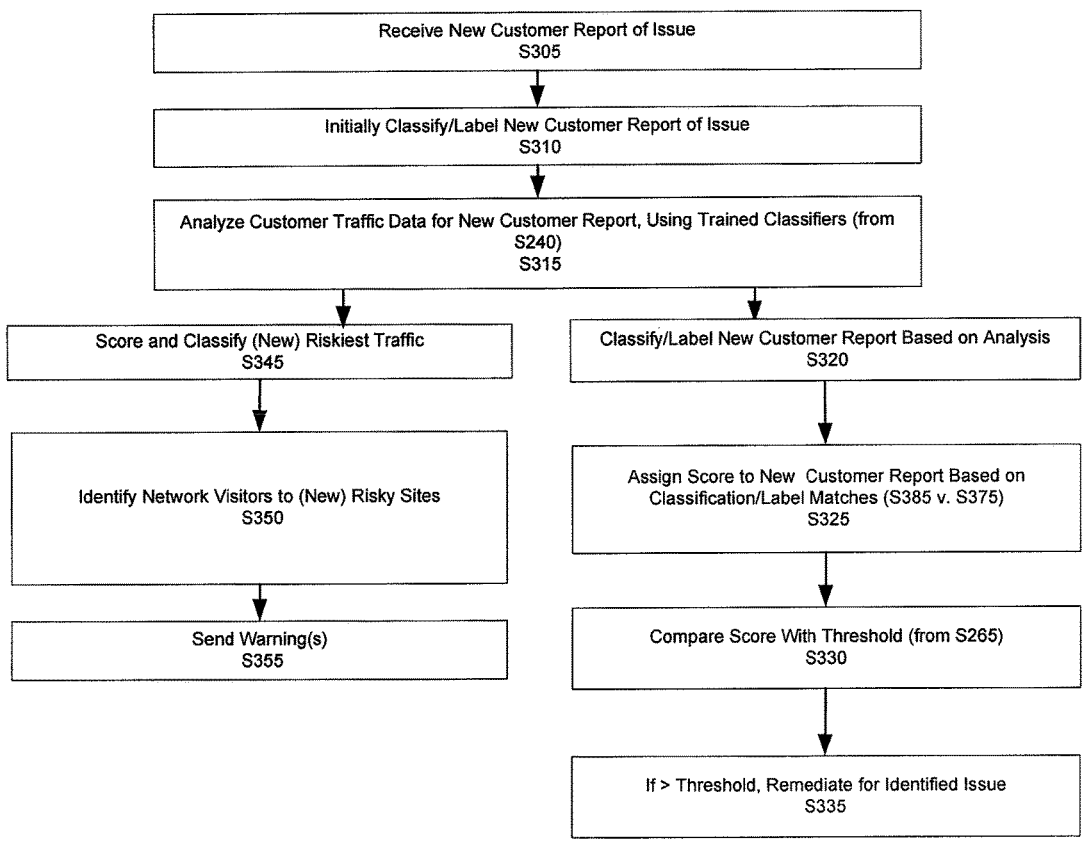
FIG. 3 shows an exemplary process for resolving customer communication security vulnerabilities, according to an aspect of the present disclosure.

FIG. 3 shows an exemplary process for resolving customer communication security vulnerabilities, according to an aspect of the present disclosure. In FIG. 3, a new customer report of an issue is received at S305. The new report may be received by a human agent or automated system from the customer, or may be detected based on a communications service provider performing a routine review of customer accounts for anomalies. The new report may also be received based on a pay service provided by a communications service provider or third party, such as a monitoring service that monitors the use of devices by minors.

At S310, the new customer report of the issue is initially classified/labeled in the same manner as at S220 in FIG. 2. At S315, the customer traffic data for the new customer report is analyzed, for example using the trained classifiers trained at S240 in FIG. 2. The classifiers are used to search for similarities with the problem behavior identified from the original reports of the issue. Thus, the classifiers may include particular addresses to look for, particular patterns of conduct to look for, and so on.

Although not required for the present disclosure, demographic data of users may also be incorporated into the analysis of traffic. For example, analysis may show that users of very particular ages are those most likely to engage in dangerous uploading/downloading behavior on certain websites or even generally. Demographic data may include basic age and gender data, as well as other know information about a user.

Other information that can be used in the analysis of traffic includes information pulled from applications on a user device, including which applications a user has installed on the device, which applications are most often used, how often or how much applications are used, and so on. Other information can also be pulled from the customer history for the account used by the user, including previous reports of issues, previous complaints from the user, and previous findings of risky behavior of the user.

At S320, the new customer report is classified and labeled based on the analysis of the customer traffic data at S315. At S325, a score is assigned to the new customer report based on matching between the initial classification and labeling before analysis at S310 and after analysis at S325. The score assigned at S325 may reflect whether the analysis validates the original reported issue, or whether the issue needs to be reclassified again at S310. In this way, a poor score assigned at S325 may show not that the customer has a valid issue, but that the issue is not a particular security issue that can be remedied by security solutions.

At S330, the score is compared with a threshold determined at S265. At S335, remediation may be provided for an identified issue if the score is above a threshold. Remediation may include providing information or warnings to the reporting customer. Remediation may also include automated remote actions performed by the communications service provider, such as uninstalling an application from a device, or blocking a device from accessing a particular website. For example, an adult customer may authorize a communications service provider to block a child from visiting a risky website or even a whole type of risky websites.

Although not belabored, the entire process in FIGS. 2 and 3 can be performed by an automated system, starting with an automated intake of a customer report of a security issue. For example, a customer may report a security issue for a user device via a website or interactive voice response (IVR) system that provides menu reporting choices. From there, a communications service provider may initially classify and label the report, order an analysis of the customer's traffic data for a specified period, identify new risky websites and classify and label the customer report again, and then assign an automated score to the report and compare the score to a threshold in order to tell the client whether the traffic history involving the device appears to be particularly risky.

As noted above, remediation can be as simple as providing information to a user, and more complex such as remotely controlling a user device in order to remove an application or install software. Software can be remotely installed in order to search and remove viruses on a user device, search and identify installed applications and the sources from which the installed applications were downloaded, and other types of analysis of content that are best performed on a user device.

Figure 4:
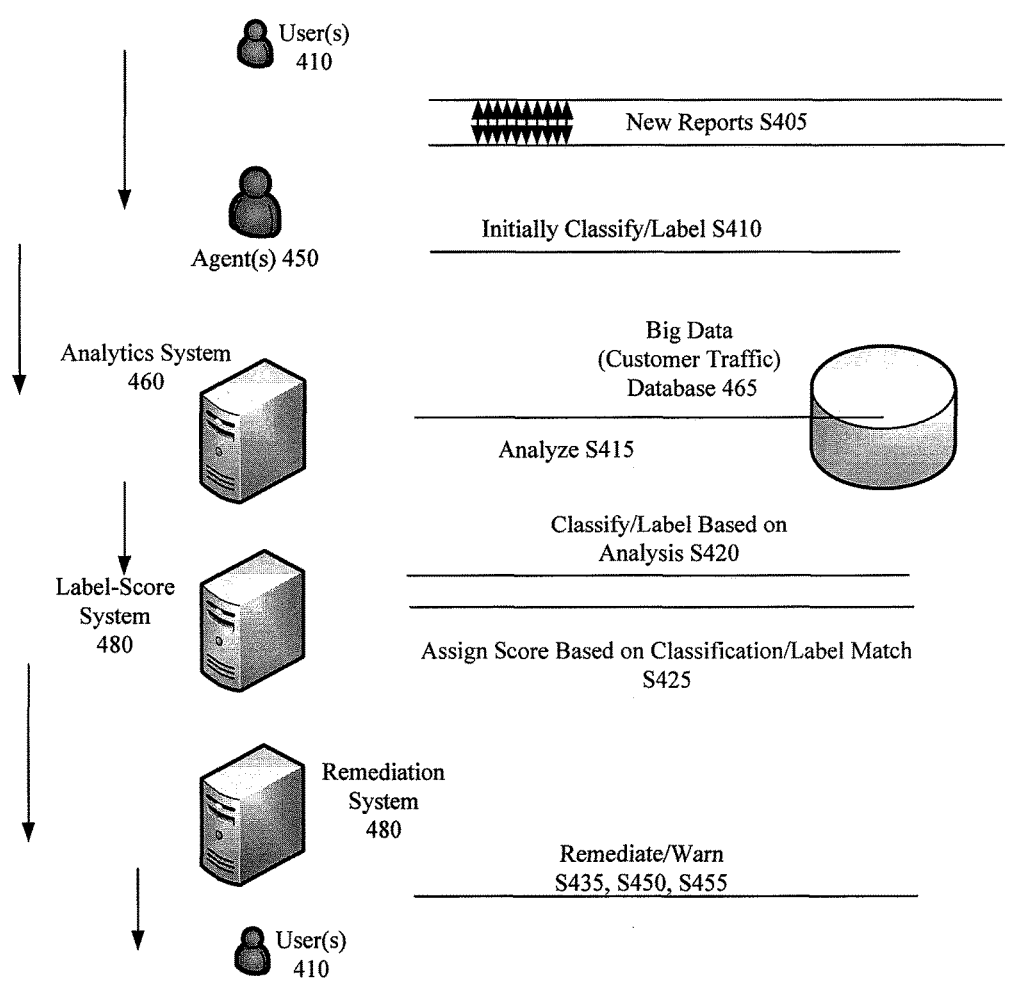
FIG. 4 shows an exemplary process for resolving customer communication security vulnerabilities, according to an aspect of the present disclosure.

FIG. 4 shows an exemplary process for resolving customer communication security vulnerabilities, according to an aspect of the present disclosure. In FIG. 4, users 410 contact agents 450. The users generate new reports at S405, and the agents initially classify and label the new reports at S410. An analytics system 460 sorts through a Big Data database 465 that holds customer traffic records. The analytics system 460 analyzes the data from the database 465 at S415, and then sends analysis results to the label-score system 480 for classification and labeling at S420 and assignment of a score at S425. A remediation system 480 then remediates and warns users 410 of risky behavior at S435, S450, and S455. As noted previously, remediation can include providing information to users such as warning users not to visit certain websites or not to download from certain websites. Alternatively, remediation can include automated remediation such as remotely removing an application from a user device, or blocking a user device or even an entire series of user devices from visiting an identified risky website.

Although in FIG. 4 and generally herein the communications data that is analyzed is described as websites and internet protocol (IP) data, other forms of communication data can also be obtained and analyzed, particularly by an integrated communication service provider. For example, short message service (SMS, or "text") data can be reviewed, as well as call detail records for voice calls from a telephony provider. Customer behavior can be analyzed from this type of information in order to determine whether customers exhibit particular behavior. For example, a recent malware may result in charges for calls to international numbers, resulting in notable and drastic changes in international calling patterns. This may be noted when a particular device begins making many international calls per day after the malware is installed on a user device, compared to only one or two international calls per month before the malware is installed. Thus, other forms of communication data can also be reviewed, whether it is obtained from the same entity or from a third party entity. The SMS or voice data can be searched for a change in the average number of international calls or SMS per day, or changes in the numbers of recipients of such calls and messages.

Figure 5:
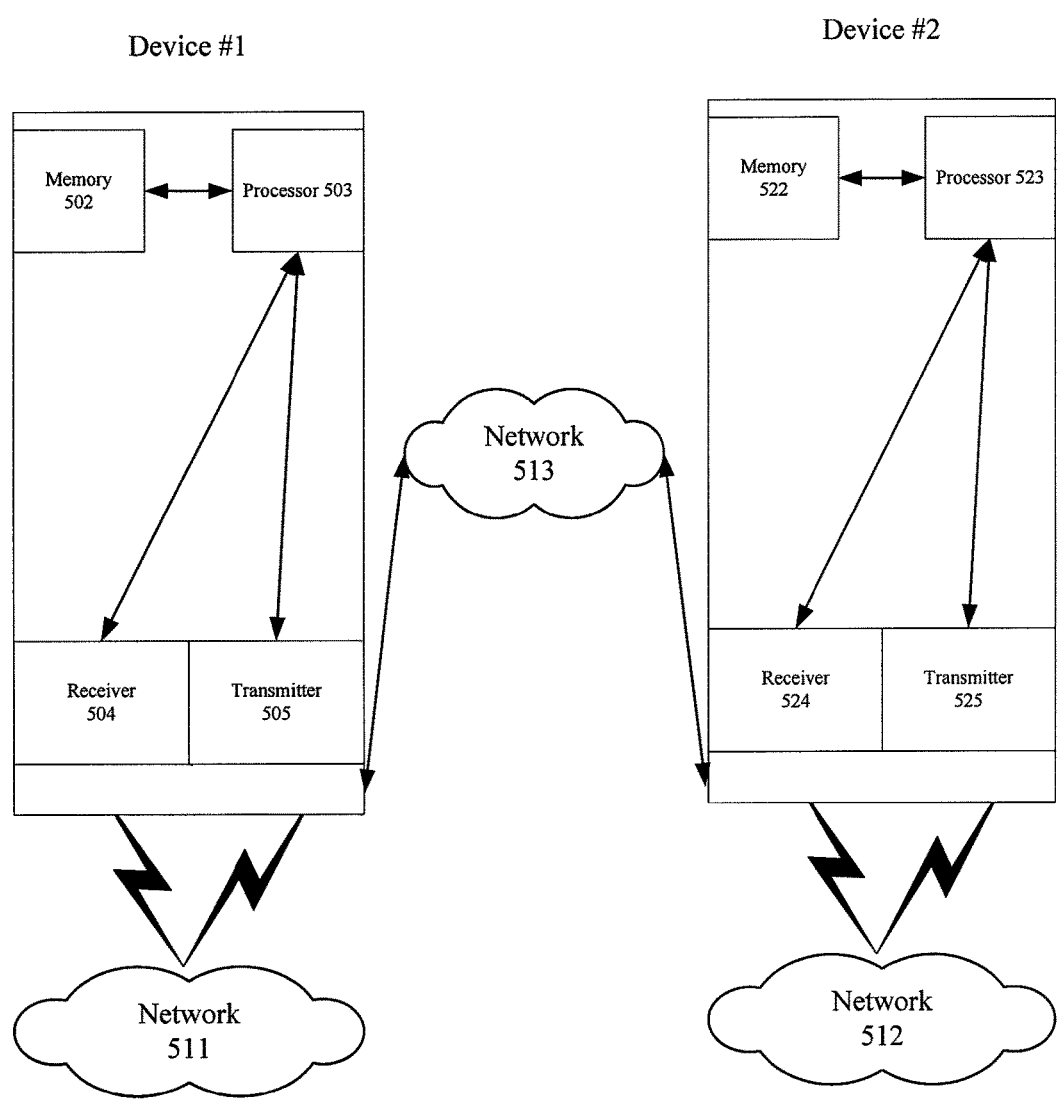
FIG. 5 shows an exemplary system for resolving customer communication security vulnerabilities, according to an aspect of the present disclosure.

FIG. 5 shows an exemplary system for resolving customer communication security vulnerabilities, according to an aspect of the present disclosure. In FIG. 5, two devices #1 and #2 interact with each other automatically so as to resolve customer communication security vulnerabilities. In FIG. 5, the two devices may be a web server that provides a website by which customers can report security concerns, and an analysis system that accesses and analyzes user traffic data held by a communications service provider. The two devices may also be an analysis system and an labeling/scoring system that label issues identified by customers and score the results of the analysis so as to show whether the issue identified by the customer is legitimate. Further, the two devices may be an analysis system and a remediation system, so as to automatically remediate a security concern based on results of an analysis.

In FIG. 5, device #1 includes a memory 502 that stores instructions and a processor 503 that processes the instructions. A transmitter 505 and receiver 504 are used for communications across a network 511. Device #1 communicates with device #2 over network 513, which may be the same network or a different network than network 511. Device #2 includes a memory 522 that stores instructions and processor 523 that executes the instructions. A receiver 524 and transmitter 525 communicate across a network 512. In FIG. 5, the two devices communicate automatically, without particular instructions from a user other than the instructions stored in memory 522, and perhaps instructions from the customer provided initially to help identify a security concern via an agent.

Figure 6:
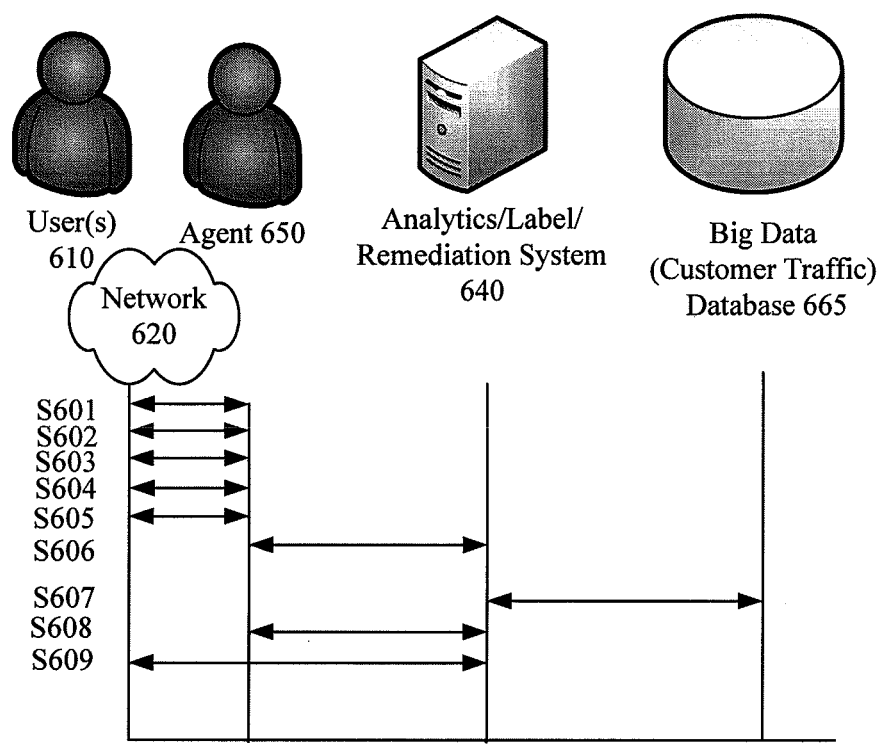
FIG. 6 shows an exemplary call flow for resolving customer communication security vulnerabilities, according to an aspect of the present disclosure.

FIG. 6 shows an exemplary call flow for resolving customer communication security vulnerabilities, according to an aspect of the present disclosure. In FIG. 6, users 610 make reports to agents 650 via network 620 at S601 to S605. The agents 650 may be human or automated. Automated agents include interactive voice response (IVR) systems, and web servers and related systems that provide web interfaces.

At S650, an agent requests analytics/label/remediation system 640 to analyze traffic histories for the users 610. At S607, the analytics/label/remediation system 640 retrieves and analyzes big data from big data (customer traffic) database 665. At S608, the analytics/label/remediation system 640 returns results to agent 650, and at S609 the analytics/label/remediation system 640 provides remediation to the users 610. In FIG. 6, the analysis and remediation are provided reactively to user reports at S601 to S605.

Figure 7:
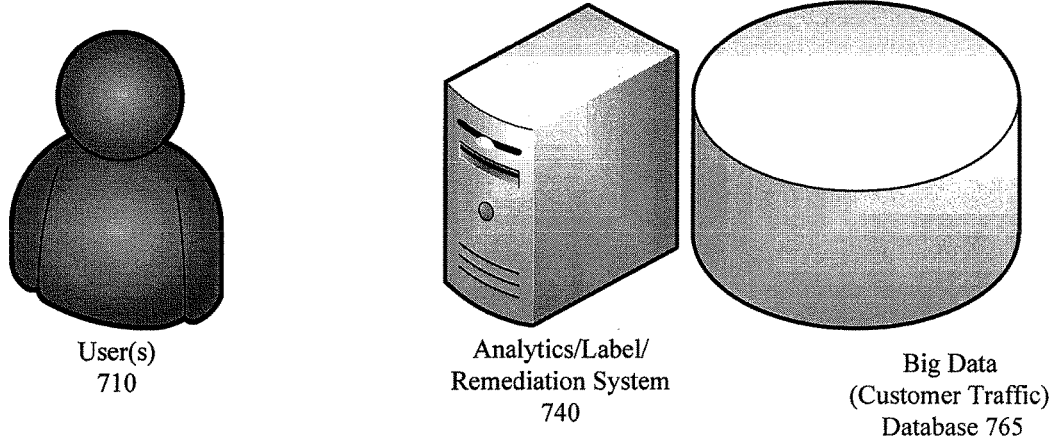
FIG. 7 shows an exemplary call flow for resolving customer communication security vulnerabilities, according to an aspect of the present disclosure.
Figure 7:
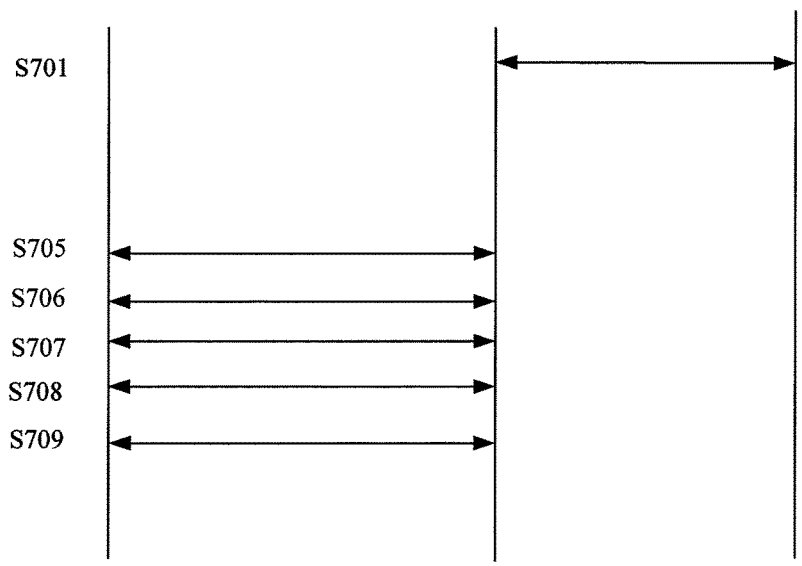

FIG. 7 shows an exemplary call flow for resolving customer communication security vulnerabilities, according to an aspect of the present disclosure. In FIG. 7, analysis and remediation are provided proactively at S701, where analytics/label/remediation system 740 accesses and analyzes data from big data (customer traffic) database 765. These features have been previously described. In FIG. 7, the analytics/label/remediation system 740 provides remediation for problems to users 710 at S705, S706, S707, S708 and S709. As noted, the remediation at S705 to S709 may be proactive rather than reactive. For example, remediation may be provided as a service.

In another example, a communication service provider may identify problematic communications based on a periodic review of user traffic, based on a specific report of an issue from a customer, based on a series of reports of an issue from customers, or otherwise. When the analysis of customer traffic on a network identifies a new problem area, such as customers visiting a very risky website, or downloading content from a risky website, or installing an application onto a user device, analytics/label/remediation system 740 may search through the big data database 765 to find other users who have engaged in similar conduct. These other users may be the users 710 who are proactively remedied, such as by being warned of the riskiness of the behavior. Depending on how serious an issue is, remediation in some cases may be more direct and intrusive, such as by automatically removing an improper application from user devices when the improper application is sending out communications from the user devices without authorization from the users. Other customers may be customers using devices in accounts entirely unrelated to the account of a reporting user, or may be customers in the same account.

Additionally, an account-holder may have provided previous instructions to tolerate certain "risky" behavior, such as downloads of movies from a particular website or using a particular application. In this way, when download volumes are detected that are likely to lead to a data overage for an account for a period, the previous instructions may be referenced in order to confirm authorization to pay a data overage fee. The previous instructions for an account may include instructions specific to, for example, a particular device, a particular user, a particular website, a particular application, and a particular "risky" behavior.

Figure 8:
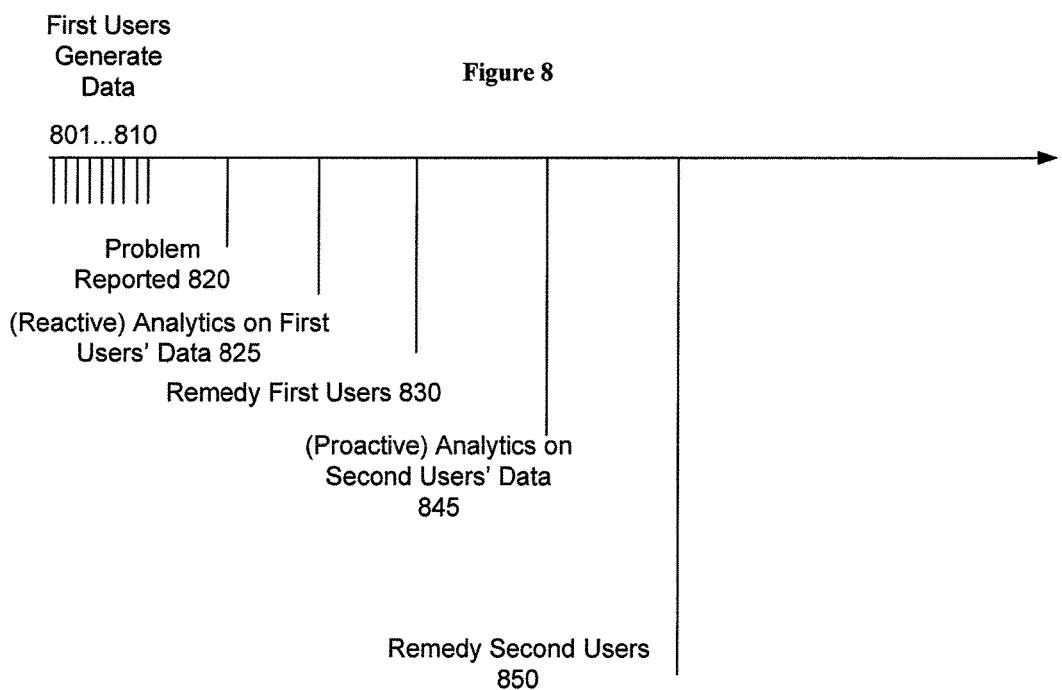
FIG. 8 shows an exemplary timeline for resolving customer communication security vulnerabilities, according to an aspect of the present disclosure.

FIG. 8 shows an exemplary timeline for resolving customer communication security vulnerabilities, according to an aspect of the present disclosure. At 801-810, users generate data by everyday activity involving communications devices. At 820 a problem is reported. At 825, reactive analytics are performed on first users' data based on the report at 820. At 830 first users are remedied consistent with the remedies described herein. At 845, proactive analytics are performed on second users' data. The second users' may be identified from a search of big data, such as based on a keyword search for a website identified as dangerous from the analysis of traffic of first users at 825. At 850, the second users are remedied proactively.

In FIG. 8, the proactive remedies for second users at 850 are provided based on the reactive analytics for the first users at 825. In this way, a communication service provider can search through Big Data when specific problems are identified, and remedy the identified problems proactively before second users even realize they are engaging in risky behavior. As noted, the remedies may range from simple warnings to automated actions to modify a user device such as by removing an application.

Figure 9:
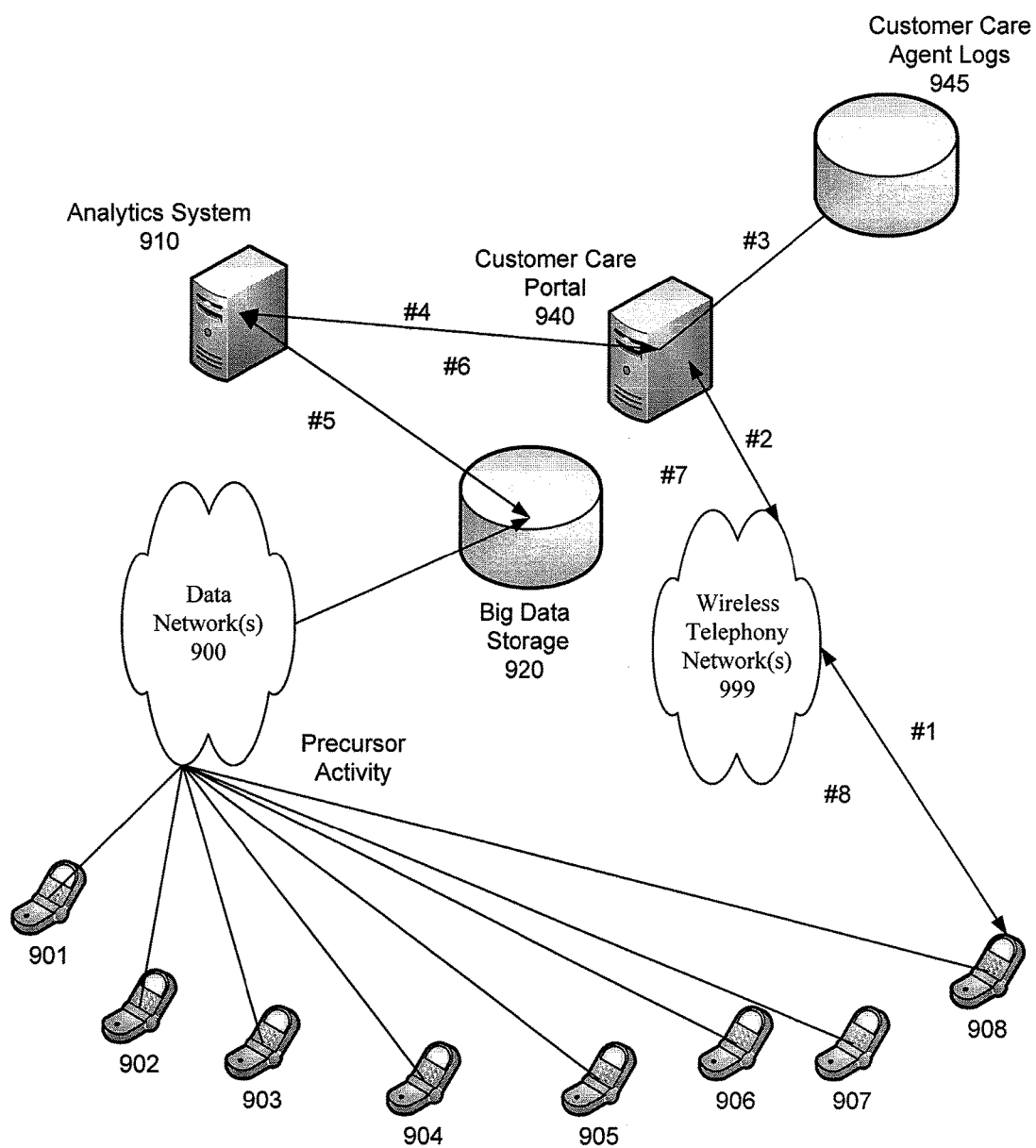
FIG. 9 shows an exemplary network for resolving customer communication security vulnerabilities, according to an aspect of the present disclosure.

FIG. 9 shows an exemplary network for resolving customer communication security vulnerabilities, according to an aspect of the present disclosure. In FIG. 9, user devices 901-908 engage in precursor activity such as everyday use of user communication devices. User device 908 at #1 begins to contact an agent system via wireless telephony network(s) 999, and is redirected to customer care portal 940 at #2. The customer care portal takes a report of a security vulnerability from the user of user device 908. The customer care portal 908 then accesses and analyzes customer care agent logs 945 at #3 to identify previous reports of the security vulnerability.

At #4, the customer care portal 940 instructs the analytics system 910 to analyze big data of communications service provider data in big data storage 920. At #5 the analytics system 910 retrieves and analyzes the traffic histories in big data storage 920. The analytics system 910 reports back to the customer care portal 940 at #6, which in turn provides remediation to device 908 via the wireless telephone networks 999 at #7 and #8.

Although not a central focus of the present disclosure, data retrieved for analysis and use may be anonymized when being reviewed by human users. For example, identifiers retrieved from a big data storage 920 can be anonymized so as to mask identifiers such as phone numbers, device numbers, and SIM card numbers and so on.

Accordingly, resolving customer communication security vulnerabilities enables an entity to calculate different scores for different users in the manner described herein. The scores may reflect different coefficients for different websites and activities, where the weighting of the coefficient reflects a perceived danger of the website or activity. The score may be a sum of calculations that reflect the danger of the websites or activity, the frequency of visits to particular websites, the length of time spent visiting particular websites, whether and how much data is downloaded from or uploaded to the particular websites, and so on. As noted herein, the score may also reflect demographic information of a user, such as whether the user is a teenager. The score may also reflect generalized information about communication usage by the user, such as whether the user texts frequently.

The uploading and downloading information may be the number of bytes uploaded to or downloaded from a specific website. The data may reflect upload and download rates and duration for particular website visits. The data that is searchable in the Big Data may also include a date, and a user's phone number which is tied to the network access provided by the communications service provider, or another identifier for the user, the device, or the account. The data may be collected for each different website, and also periodically such as every 1 or 5 minutes when a user stays on a single website for an extended period of time.

The communications service provider described herein may be a wireless telephony network provider, a wireless data network provider, or a variety of other kinds of network providers including a traditional broadband landline internet provider. The user devices may be smart phones, tablets, laptops or any other device which a user can use to access risky destinations over a network provided by a communication service provider.

The metrics used to judge riskiness of a particular destination or activity may reference averages of users, rather than activity only involving a particular user. For instance, a new/risky website may be measured for riskiness based on how long an average user visits the website, how often, how much data the average user downloads or uploads, etc.

Different issues and problems may also be handled differently using the remedies described herein. For instance, a website from which a user device is downloading large amounts of data may present a different problem than a virus-infected website. The remedy for a virus-infected website or application may be to uninstall the application or block access to the website entirely, whereas the remedy for a website from which a user is downloading large amounts of data may be simply to advise the user of approaching data limits.

Additionally, communications addresses visited by a user may be ranked in terms of danger. The rankings may correlate to the coefficients used to calculate danger scores herein, so that a top ranked website may have the highest coefficient of riskiness. In this way, a score for a user that is compared to a threshold is based on a pattern of user activity, and not necessarily just a single instance or visit to a single website.

Although resolving customer communication security vulnerabilities has been described with reference to several exemplary embodiments, it is understood that the words that have been used are words of description and illustration, rather than words of limitation. Changes may be made within the purview of the appended claims, as presently stated and as amended, without departing from the scope and spirit of resolving customer communication security vulnerabilities in its aspects. Although resolving customer communication security vulnerabilities has been described with reference to particular means, materials and embodiments, resolving customer communication security vulnerabilities is not intended to be limited to the particulars disclosed; rather resolving customer communication security vulnerabilities extends to all functionally equivalent structures, methods, and uses such as are within the scope of the appended claims.

As described above, the predictive analysis can vary based on the problem a service provider wants to help users avoid. For example, a risk of overage can be expressed differently than a risk of popup ad exposure or a risk of virus infection. These kinds of problems users encounter can be correlated with website visit activity by the users, and website visit activity may itself be recorded by a communications service provider. The website visit activity can be classified based on an analysis performed by an one or more software algorithms.

Examples of raw data stored by a service provider might be as follows:

| -unix_time- | - phone- | - downlink- | - uplink- | - website- |
| --- | --- | --- | --- | --- |
| 1402811400 | yyy | 180188.0 | 100000.0 | website1.com |
| 1402811400 | yyy | 306168.0 | 10000.0 | website1.com |
| 1402811400 | yyy | 100000.0 | 0.0 | website2.com |
| 1402811400 | yyy | 10000.0 | 0.0 | website3.com |
| 1402811400 | yyy | 100000.0 | 0.0 | website4.com |

This data can be classified using a process that correlates user: yyy with two visits to website 1, one visit to website 2, one visit to website 3, and one visit to website 4. The resultant data can be visually modeled in a three dimensional space using support vector machines (SVMs). Support vector machines are supervised learning models that apply algorithms to analyze data and recognize patterns. A support vector machine can be used for classification and regression analysis. Using the data from website visit activity from one or more users, websites that generate popups can be identified at a validated 90% rate, and websites that result in overages and viruses can be identified at a validated 75-80% rate.

The support vector machine model is then a representation of examples as points in space. The map of examples divides the different categories by a clear gap that is as wide as possible. New examples can be mapped into the space and predicted to belong to a category based on which side of the gap they fall on.

Additionally, a support vector machine can efficiently perform a non-linear classification using what the kernel trick, implicitly mapping inputs into high-dimensional feature spaces. A linear kernel produces a flat surface, such that the top websites can be derived from a linear support vector machine. As a result, a support vector machine applied to website visit activity history can produce top websites as a result. The websites can be output in rank order based on the analysis, and associated with a respective coefficient ranking.

A score then can be calculated based on each user's activity on these top websites. The score can be a sum of the coefficient for a website multiplied by the number of visits to the website. The score can, of course, be nuanced, to reflect additional considerations such as more minute details of visits including length of time visiting a website, the volume of data transmitted to or from the website, and so on.

As described above, a result of usage history analysis can be used to assign a score. The score is based on a population comparison, where the more risky the behavior the higher the score. Additionally, the closer the score of a newly-reporting customer is to the score of previous customers having a particular problem, the more likely that the newly-reporting customer has the same problem.

The scores described herein can also be used to predict security vulnerabilities, even when a user's device has not been infected yet with a virus or exposed to excessive data usage. In this way, a user's traffic habits can be analyzed to assign the user a score for riskiness, and even provide specific remedies for identified dangerous behavior. An obvious benefit to selectively providing such warnings and remedies is user satisfaction by avoiding infected hardware and excessive unexpected fees.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described above, according to an aspect of the present disclosure, a method is provided for resolving customer communication security vulnerabilities. The method includes obtaining a usage history for a user device including communications involving the user device. Pattern recognition is applied to the usage history. The user device is assigned a risk classification from a predetermined set of possible risk classifications, based on the pattern recognition. A vulnerability on the user device is remedied when the risk classification exceeds a predetermined threshold.

According to another aspect of the present disclosure, the method includes identifying, from the usage history and based on the pattern recognition, a risk characteristic; and assigning a score to the identified risk characteristic. The risk classification is based on the score.

According to yet another aspect of the present disclosure, the method includes identifying additional user devices that share the identified risk characteristic, and notifying users of the additional user devices of a risk associated with the identified risk characteristic.

According to still another aspect of the present disclosure, the method includes identifying additional user devices that share the identified risk characteristic, and remedying the vulnerability on the additional user devices based on identification of the shared risk characteristic. Here, a customer may have provided previous instructions based on a particular concern for a risk. For example, a customer may have provided previous instructions that overages based on movie downloads can be authorized for a specific device. The instructions may also specify that the customer pre-authorizes a data overage fee when the excessive downloading is detected based on the analysis described herein. Thus, the additional user devices may be unrelated devices used by users in completely different accounts, or may be additional user devices that fall in, for example, the same account.

According to another aspect of the present disclosure, the usage history is obtained by a communication service provider for a customer's user device.

According to yet another aspect of the present disclosure, access to the usage history is restricted by the communication service provider.

According to still another aspect of the present disclosure, the users of the additional user devices are other customers of the communication service provider. Additionally, data used in the analysis described herein may be anonymized after the analysis, so as to remove identifiers such as phone number, device number, SIM card number etc. Phone numbers are de-anonymized selectively, such as when remediation is required.

According to another aspect of the present disclosure, the usage history to which the pattern recognition is applied includes visits to websites using the customer's user device.

According to yet another aspect of the present disclosure, the method includes obtaining and analyzing customer service agent logs for reports of the vulnerability based on a report from the user of the user device. The method also includes analyzing usage history for user devices used by users identified from the customer service agent logs as reporting the vulnerability. The method further includes comparing the usage history for the user devices used by the identified users with usage histories from a control group to identify the vulnerability.

According to still another aspect of the present disclosure, the method includes identifying problem traffic based on the comparing.

According to another aspect of the present disclosure, the method includes training classifiers to recognize the problem traffic based on the comparing.

According to yet another aspect of the present disclosure, the method includes analyzing traffic data for additional users using the trained classifiers.

According to still another aspect of the present disclosure, the method includes warning the additional users of problem traffic based on analyzing traffic data for the additional users using the trained classifiers.

According to another aspect of the present disclosure, the method includes setting a threshold; and comparing the score to the threshold in order to determine the risk classification.

According to yet another aspect of the present disclosure, the method also includes analyzing customer traffic for another customer; assigning a score to the traffic for the another customer, and classifying the another customer based on the score.

According to still another aspect of the present disclosure, the method includes identifying, from the usage history, a destination address correlated with a particular risk to visitors.

According to another aspect of the present disclosure, the risk is of virus infections.

According to yet another aspect of the present disclosure, the risk is of persistent popups.

According to an aspect of the present disclosure, a tangible computer readable storage medium stores a computer program. The computer program, when executed by a processor, causes a computer apparatus to perform a process. The process includes obtaining a usage history for a user device including communications involving the user device. The process also includes applying pattern recognition to the usage history. The user device is assigned a risk classification from a predetermined set of possible risk classifications, based on the pattern recognition. A vulnerability on the user device is remedied when the risk classification exceeds a predetermined threshold.

According to an aspect of the present disclosure, a computer apparatus includes a memory that stores instructions, and a processor that executes the instructions. When executed by the processor, the instructions cause the processor to perform operations. The operations include obtaining a usage history for a user device including communications involving the user device. The operations also include applying pattern recognition to the usage history. The operations also include assigning the user device with a risk classification from a predetermined set of possible risk classifications, based on the pattern recognition. The operations also include remedying a vulnerability on the user device when the risk classification exceeds a predetermined threshold.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of resolving customer communication security vulnerabilities, the method comprising:
    storing, in a database, a plurality of existing reports, the plurality of existing reports being customer reports of issues and associated with classifications;
    analyzing, by a processor, traffic data for reporting customers of the plurality of existing reports to identify risky behavior;
    obtaining, via a communication network, a report of an issue of a first user device and a usage history for the first user device, the usage history including communications involving the first user device;
assigning a first classification to the report of the issue of the first user device;
searching for similarities between the usage history of the first user device and the risky behavior identified for the plurality of existing reports which matches the report of the issue of the first user device;
assigning the report of the issue of the first user device a second classification based on the similarities;
assigning a score to the report of the issue of the first user device based on matching between the first classification and the second classification;
remedying, via the communication network and by an automated remote action, a first vulnerability on the first user device when the score exceeds a predetermined threshold, the automated remote action including blocking the first user device from accessing a network location, accessing the network location being identified as the risky behavior;
searching data to identify a second user device that has performed a keyword search for the network location, the second user device being in a same account as the first user device; and
proactively remedying, by the automated remote action, a second vulnerability on the second user device to block the second user device from accessing the network location,
wherein the second vulnerability is proactively remedied on the second user device in response to the second user device being identified in the search of the data as being in the same account as the first user device and having performed the keyword search for the network location, and not when the second end user device performs the keyword search for the network location.

2. The method of claim 1, further comprising:
identifying, from the usage history of the user device, a new problem area.

3. The method of claim 2, further comprising:
searching a database to find additional user devices that engaged in the new problem area;
identifying the additional user devices that engaged in the new problem area; and
notifying users of the additional user devices of a risk associated with the new problem area.

4. The method of claim 2, further comprising:
searching a database to find additional user devices that engaged in the new problem area;
identifying the additional user devices that engaged in the new problem area; and
remedying the vulnerability on the additional user devices based on identification of the new problem area.

5. The method of claim 1,
wherein the usage history of the user device is obtained by a communication service provider for the user device.

6. The method of claim 5,
wherein access to the usage history of the user device is restricted by the communication service provider.

7. The method of claim 5,
wherein additional user devices, from which the plurality of existing reports is obtained, receive communication services from the communication service provider.

8. The method of claim 1,
wherein the usage history of the user device includes visits to websites by the user device.

9. The method of claim 1, further comprising:
obtaining and analyzing the plurality of existing reports;
analyzing a usage history of each of the plurality of existing reports; and
comparing the usage history of each of the plurality of existing reports to identify the risky behavior.

10. The method of claim 9, further comprising:
identifying problem traffic based on the comparing.

11. The method of claim 10, further comprising:
training classifiers to recognize the problem traffic based on the comparing.

12. The method of claim 11, further comprising:
analyzing traffic data for additional users using the classifiers.

13. The method of claim 12, further comprising:
warning the additional users of the problem traffic based on the analyzing of the traffic data for the additional users using the classifiers.

14. The method of claim 1, further comprising:
setting the predetermined threshold; and
comparing the score to the predetermined threshold in order to determine whether remediation is necessary.

15. The method of claim 1, further comprising:
analyzing traffic for another user device;
assigning a score to the traffic for the another user device, and
classifying the another user device based on the score.

16. The method of claim 1, further comprising:
identifying, from the usage history of the user device, a destination address correlated with a particular risk to visitors.

17. The method of claim 16,
wherein the risk is of virus infections.

18. The method of claim 16,
wherein the risk is of popups.

19. A non-transitory computer readable storage medium that stores a computer program, the computer program, when executed by a processor, causing a computer apparatus to perform a process comprising:
storing, in a database, a plurality of existing reports, the plurality of existing reports being customer reports of issues and associated with classifications;
analyzing traffic data for reporting customers of the plurality of existing reports to identify risky behavior;
obtaining, via a communication network, a report of an issue of a first user device and a usage history for the first user device, the usage history including communications involving the first user device;
assigning a first classification to the report of the issue of the first user device;
searching for similarities between the usage history of the first user device and the risky behavior identified for the plurality of existing reports which matches the report of the issue of the first user device;
assigning the report of the issue of the first user device a second classification based on the similarities;
assigning a score to the report of the issue of the first user device based on matching between the first classification and the second classification;
remedying, via the communication network and by an automated remote action, a first vulnerability on the first user device when the score exceeds a predetermined threshold, the automated remote action including blocking the first user device from accessing a network location, accessing the network location being identified as the risky behavior;

searching data to identify a second user device that has performed a keyword search for the network location, the second user device being in a same account as the first user device; and proactively remedying, by the automated remote action, a second vulnerability on the second user device to block the second user device from accessing the network location, wherein the second vulnerability is proactively remedied on the second user device in response to the second user device being identified in the search of the data as being in the same account as the first user device and having performed the keyword search for the network location, and not when the second end user device performs the keyword search for the network location.

20. A computer apparatus, comprising:
a memory that stores instructions, and
a processor that executes the instructions,
wherein, when executed by the processor, the instructions cause the processor to perform operations comprising:
storing, in a database, a plurality of existing reports, the plurality of existing reports being customer reports of issues and associated with classifications;
analyzing traffic data for reporting customers of the plurality of existing reports to identify risky behavior;
obtaining, via a communication network, a report of an issue of a first user device and a usage history for the first user device, the usage history including communications involving the first user device;
assigning a first classification to the report of the issue of the first user device;
searching for similarities between the usage history of the first user device and the risky behavior identified for the plurality of existing reports which matches the report of the issue of the first user device;
assigning the report of the issue of the first user device a second classification based on the similarities;
assigning a score to the report of the issue of the first user device based on matching between the first classification and the second classification;
remedying, via the communication network and by an automated remote action, a first vulnerability on the first user device when the score exceeds a predetermined threshold, the automated remote action including blocking the first user device from accessing a network location, accessing the network location being identified as the risky behavior;
searching data to identify a second user device that has performed a keyword search for the network location, the second user device being in a same account as the first user device; and
proactively remedying, by the automated remote action, a second vulnerability on the second user device to block the second user device from accessing the network location, and
the second vulnerability is proactively remedied on the second user device in response to the second user device being identified in the search of the data as being in the same account as the first user device and having performed the keyword search for the network location, and not when the second end user device performs the keyword search for the network location.

* * * * *